United States Patent
Blatchley et al.

(10) Patent No.: US 10,507,707 B2
(45) Date of Patent: Dec. 17, 2019

(54) CONTROLLING HVAC COMPRESSOR SPEED IN A VEHICLE

(71) Applicant: FORD GLOBAL TECHNOLOGIES, LLC, Dearborn, MI (US)

(72) Inventors: Timothy Noah Blatchley, Dearborn, MI (US); Angel Fernando Porras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 14/737,848

(22) Filed: Jun. 12, 2015

(65) Prior Publication Data
US 2016/0361975 A1    Dec. 15, 2016

(51) Int. Cl.
*B60H 1/32* (2006.01)
*B60H 1/00* (2006.01)

(52) U.S. Cl.
CPC ......... *B60H 1/3225* (2013.01); *B60H 1/3214* (2013.01); *B60H 1/3216* (2013.01); *B60H 1/3222* (2013.01); *B60H 1/00385* (2013.01); *B60H 2001/325* (2013.01); *B60H 2001/3238* (2013.01); *B60H 2001/3272* (2013.01); *B60H 2001/3292* (2013.01)

(58) Field of Classification Search
CPC ...... B60H 2001/3292; B60H 2001/325; B60H 2001/3272; B60H 1/00385
See application file for complete search history.

(56) References Cited

U.S. PATENT DOCUMENTS

| | | | | |
|---|---|---|---|---|
| 4,989,414 A | * | 2/1991 | Murayama | F04C 28/08 62/196.3 |
| 5,036,676 A | | 8/1991 | Dudley | |
| 5,632,156 A | * | 5/1997 | Takeo | B60H 1/3205 62/160 |
| 6,484,520 B2 | * | 11/2002 | Kawaguchi | B60H 1/3208 62/133 |
| 6,622,500 B1 | * | 9/2003 | Archibald | B60H 1/3205 62/173 |

(Continued)

FOREIGN PATENT DOCUMENTS

JP    10185373 A    *    7/1998

*Primary Examiner* — Frantz F Jules
*Assistant Examiner* — Lionel Nouketcha
(74) *Attorney, Agent, or Firm* — David Kelley; Brooks Kushman P.C.

(57) ABSTRACT

A heating, ventilation, and air-conditioning (HVAC) system in a hybrid or battery-electric vehicle is provided. The HVAC system includes a compressor that has its own dedicated motor to control its speed. The compressor includes an inlet pressure sensor to determine and output the suction pressure, and an outlet pressure sensor to determine and output the discharge pressure of the compressor. At least one controller can be programmed to determine the discharge-to-suction pressure ratio, and limit the operating speed of the compressor in response to the ratio exceeding a pressure-ratio-threshold. The pressure-ratio-threshold can vary based on ambient air temperature. In the event an inlet pressure sensor is not available, the operating speed of the compressor can be reduced in response to the outlet pressure exceeding an ambient-temperature-based variable threshold.

3 Claims, 2 Drawing Sheets

(56) References Cited

U.S. PATENT DOCUMENTS

| | | | |
|---|---|---|---|
| 2006/0112702 A1* | 6/2006 | Martin | B60H 1/00378 62/180 |
| 2006/0204368 A1 | 9/2006 | Imai et al. | |
| 2014/0182832 A1* | 7/2014 | Styles | B60H 1/00278 165/202 |
| 2014/0266223 A1* | 9/2014 | Foley | H01M 8/04992 324/426 |

* cited by examiner

CONTROLLING HVAC COMPRESSOR SPEED IN A VEHICLE

TECHNICAL FIELD

This disclosure generally relates to controlling the speed of a compressor in an HVAC system of a vehicle. More specifically, this disclosure relates to controlling the speed of the compressor based on the pressure of refrigerant entering and/or exiting the compressor.

BACKGROUND

Heating, ventilation and air conditioning (HVAC) systems have existed in vehicles for decades. In typical HVAC systems, a compressor is connected to an engine crankshaft by a belt or the like such that the compressor rotates with the engine. Rotation of the compressor compresses and circulates refrigerant or other fluid throughout the HVAC system. In conventional non-hybrid, engine-only vehicles, the speed of the compressor depends on the speed of the crankshaft.

HVAC systems have evolved with the corresponding popularity of hybrid-electric vehicles (HEVs) or battery-electric vehicles (BEVs). In such vehicles, a separate compressor motor (powered by a battery) may operate the compressor. This allows the compressor to be operated at controllable varying speeds, and entirely separate from the various powertrain components, such as the crankshaft.

SUMMARY

According to one embodiment, a heating, ventilation and air-conditioning (HVAC) system for a vehicle is provided. A compressor is included, along with an inlet for providing refrigerant to the compressor and an outlet for discharging refrigerant from the compressor. At least one controller is programmed to limit operating speed of the compressor in response to a ratio of outlet pressure to inlet pressure exceeding a variable pressure-ratio-threshold.

The pressure-ratio-threshold can vary based on ambient temperature.

The pressure-ratio-threshold can increase as ambient air temperature decreases.

According to another embodiment, a vehicle comprises a high-voltage battery, a motor electrically coupled to the battery, and a compressor of an HVAC system. The compressor is configured to be driven by the motor and includes an outlet for discharging refrigerant therefrom. At least one controller is programmed to limit operating speed of the compressor in response to an outlet pressure exceeding a variable pressure-threshold.

According to yet another embodiment, a method of controlling a compressor in an HVAC system of a vehicle is provided. The method comprises varying an operating speed of the compressor in response to a ratio of outlet pressure to inlet pressure of the compressor exceeding a variable pressure-ratio-threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
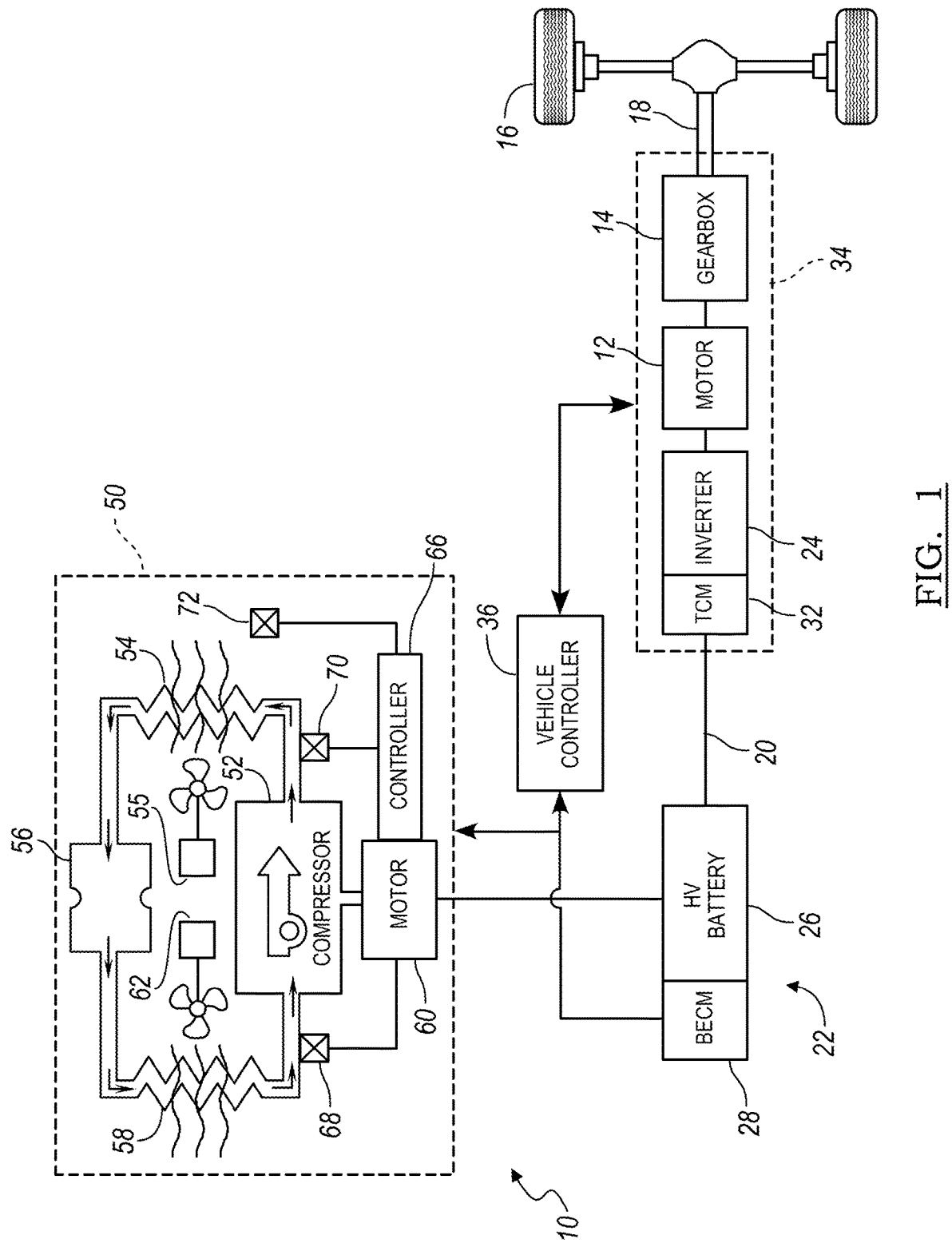
FIG. 1 is a schematic representation of a vehicle with a variable-speed compressor in an HVAC system, according to one embodiment.

Referring to FIG. 1, an electric vehicle 10, such as a battery electric vehicle (BEV), is illustrated in accordance with one or more embodiments. FIG. 1 represents only one type of BEV architecture, and is not intended to be limiting. The present disclosure may be applied to any suitable BEV. Additionally, in other embodiments, this disclosure may be applied to other vehicle architectures, such as a plug-in hybrid vehicle (PHEV) or other hybrid electric vehicles (HEVs) in which an engine can also act as a source of propulsion for the vehicle.

The vehicle 10, or BEV, is an all-electric vehicle propelled through electric power, such as by an electric motor 12, and without assistance from an internal combustion engine. The motor 12 receives electrical power and provides mechanical rotational output power. The motor 12 is connected to a gearbox 14 for adjusting the output torque and speed of the motor 12 by a predetermined gear ratio. The gearbox 14 is connected to a set of drive wheels 16 by an output shaft 18. Other embodiments of the vehicle 10 include multiple motors, such as a motor at each wheel 16 (not shown), for propelling the vehicle 10. The motor 12 may also function as a generator for converting mechanical power into electrical power through, for example, regenerative braking. A high voltage bus 20 electrically connects the motor 12 to an energy storage system 22 through an inverter 24.

The energy storage system 22 includes a main battery 26 and a battery energy control module (BECM) 28, according to one or more embodiments. The main battery 26 is a high voltage (HV) battery, or traction battery, that may output electrical power to operate the motor 12. The main battery 26 is a battery pack made up of one or more battery modules (not shown). Each battery module may contain one battery cell or a plurality of battery cells. The battery cells are heated and cooled using a fluid coolant system, air coolant system, or other coolant method as is known in the art. The BECM 28 acts as a controller for the main battery 26 and commands the battery to provide electric power to the motor 12 when needed. In embodiments in which the vehicle is a HEV, an engine (not shown) may be coupled to a generator (not shown) which generates electric energy from rotation of the engine and stores the energy in the main battery 26. This generated energy can then be used to power the motor 12.

The motor 12, the gearbox 14, the inverter 24, and a transmission control module (TCM) 32 are collectively referred to as a transmission 34. A vehicle control unit (VCU), or vehicle controller 36, communicates with the transmission 34 for coordinating the function of the transmission 34 with other vehicle systems. The controller 36, BECM 28, and TCM 32 are illustrated as separate controller modules. The control system for the vehicle 10 may include any number of controllers, and may be integrated into a single controller, or have various modules. Some or all of the controllers may be connected by a controller area network (CAN) or other system. The control system may be configured to control operation of the various components of the transmission 34 and the battery 26 under any of a number of different conditions, as well as the heating, ventilation and air conditioning (HVAC) system 50 that will be discussed further below. These controllers, and possibly other controllers in the vehicle, may collectively be referred to as at least one controller.

The TCM 32 is configured to control specific components within the transmission 34, such as the motor 12 and/or the inverter 24. The vehicle controller 36 monitors the temperature of the motor 12 and receives a throttle request (or desired motor torque request) from the driver. Using this information the vehicle controller 36 provides a motor torque request to the TCM 32. The TCM 32 and the inverter 24 convert the direct current (DC) voltage supply by the main battery 26 into signals that are used to control the motor 12 in response to the motor torque request.

The vehicle controller 36 provides information to the driver through a user interface (not shown). The user interface may include features that permit a user to enter requirements or desired operating or charging parameters of the vehicle, or other vehicle operating parameters into the controller 36. The user interface may include a touch screen interface, a wireless connection to a remote station, such as a mobile device or computer, and other input interfaces as are known in the art. The vehicle controller 36 provides output to the user interface, such as a motor status or charge level status, which may be conveyed visually to the driver.

The user interface may also be used by the user to control the HVAC system 50. For example, the user may input a desired cabin temperature using the user interface. Alternatively, the controller 36 may include a probabilistic or other logic module that determines a user's driving habits, including desired cabin climate preferences, along with other driving habits such as trip lengths, trip paths, departure times, etc. The user's desired cabin climate preferences can be forwarded to the vehicle controller 36 which correspondingly controls the HVAC system 50 to match the user's preferences.

The HVAC system 50 includes a climate control system that can be used for heating and cooling the vehicle cabin as well as various vehicle components, such as the battery 26. The HVAC system 50 includes a compressor 52, condenser 54, restricting device 56, and an evaporator 58, all of which are serially connected to circulate refrigerant through a hermetically sealed refrigeration circuit. The compressor 52 is driven by a variable speed motor 60 and compresses refrigerant to raise its pressure. The compressor 52 and motor 60 are shown as two separate units, but may be also be a single unit in order to eliminate shaft seal refrigerant leakage and improve packaging. The compressor 52 and its motor 60 may collectively and simply be referred to as a compressor. The refrigerant flows from the compressor 52 to the condenser 54 where the refrigerant rejects heat and condenses. A fan 55 can be utilized to pass air over the condenser to aid in the heat rejection and condensation. The high-pressure liquid refrigerant then expands as it passes through the restriction device 56 and flows to the evaporator 58. The cool refrigerant in the evaporator 58 removes heat from the air passing through the evaporator with the refrigerant from the evaporator flowing, as a gas or two-phase fluid, back to the compressor 52 to repeat the cycle. A motor-driven blower 62 may be operated to pull outside air over the evaporator 58 and send the cooled air to the cabin to lower the temperature of the cabin.

As previously described, the compressor 52 is an electric compressor that is driven by its own motor 60 which is powered by the battery 26. This arrangement is preferential in a BEV or HEV so that the compressor can be controlled independent of engine operation. In other words, the compressor speed can be independently controlled by the motor 60 and does not depend on engine speed. A compressor motor controller 66 can be programmed to control operation of the compressor 52 and the motor 60, and can also be coupled for commands to the main vehicle controller 36.

Protection against inoperability of the compressor 52 and/or its motor 60 is typically accomplished monitoring the compressor refrigerant discharge temperature, and/or the temperature limits of the compressor 52. However, because of difficulties in observing the temperature of the refrigerant itself within the compressor, opportunities for inoperable conditions of the compressor 52 may still be present.

The compressor 52 can operate at low ambient temperature conditions providing a low compressor suction pressure, yet the compressor can still operate near the discharge pressure limits. This can lead to high pressure ratios (compressor discharge pressure to compressor suction pressure) as well as low refrigerant mass flow rates. When these flow rates drop low enough due to high pressure ratios and low suction temperatures, it is imperative that the oil circulation in the compressor does not become too low or stop. This could lead to minimal cooling within the compressor's scroll, or overheating. Other sensors in the HVAC system cannot properly detect this localized high scroll temperature because of their location downstream of the compressor scroll.

Therefore, according to embodiments of this disclosure, a control strategy is provided for optimal operation of the compressor and/or its motor. The control strategy monitors the pressure and correspondingly can alter the operating speed of the compressor.

In one embodiment illustrated in FIG. 1, the HVAC system 50 may include a low pressure sensor 68 that is configured to send signals to the controller 66 or 36 indicative of the suction pressure or inlet pressure of the refrigerant at the inlet of the compressor 52. Similarly, a high pressure sensor 70 may be provided and configured to send signals to the controller 66 or 36 indicative of the discharge pressure or outlet pressure of the refrigerant at the outlet of the compressor 52. The controller can then determine a pressure ratio, being the discharge pressure to suction pressure. This pressure ratio can be compared to the ambient air temperature, as indicated from an ambient air temperature sensor 72, to indicate when the system may likely be operating in an undesirable range. If the system is operating in an undesirable range, the controller 66 can command a reduction in speed of the compressor 52. In other words, the controller 66 can reduce or limit the operating speed of the compressor 52 in response to the pressure ratio exceeding a pressure-ratio-threshold that varies based on ambient temperature. This reduction in compressor speed lowers the pressure ratio below a maximum allowable pressure ratio specific for the ambient air temperature.

Table 1 below illustrates one embodiment of maximum allowable discharge-to-suction pressure ratios (Max_P_ratio) for various respective ambient air temperatures. These maximum pressure ratios can be thresholds that, when exceeded, indicate undesirable compressor operation parameters. As the ambient air temperature decreases, an increased maximum allowable pressure ratio is allowable to account for increasing operating pressure ratios at low temperatures. When the controller determines that the maximum allowable pressure ratio has been reached for a given ambient air temperature, the controller 66 may reduce the operating speed of the compressor 52 to reduce the discharge-to-suction pressure ratio. The controller can reduce or limit the operating speed of the compressor to maintain the actual discharge-to-suction pressure ratio below or equal to the maximum allowable discharge-to-suction ratio.

TABLE 1

Max_P_ratio

| | Ambient Temperature [C.] | | | | | |
|---|---|---|---|---|---|---|
| | −20 | −10 | 0 | 10 | 20 | 30 |
| Max Discharge-To-Suction Pressure Ratio | 17 | 15 | 12 | 10 | 10 | 10 |

If a low pressure sensor 68 is either not present in the HVAC system or is inoperable, the discharge pressure as determined from the high pressure sensor 70 can be used to estimate if the pressure ratio is undesirable. A calibratable look-up table can include various maximum allowable discharge pressures (Max_P_Disch) for respective ambient air temperatures. These maximum discharge pressures can be thresholds that, when exceeded, indicate undesirable compressor operation parameters. As the ambient air temperature decreases, the allowable compressor discharge pressure also decreases. When the controller determines that the maximum allowable discharge pressure has been reached for a given ambient air temperature, the controller 66 may reduce the operating speed of the compressor 52 to reduce the discharge-to-suction pressure ratio. The controller can reduce or limit the operating speed of the compressor to maintain the actual discharge pressure below or equal to the maximum allowable discharge pressure. Examples of maximum discharge pressures allowable for given ambient air temperatures are shown below in Table 2.

TABLE 2

Max_P_Disch

| | Ambient Temperature [C.] | | | | | |
|---|---|---|---|---|---|---|
| | −20 | −10 | 0 | 10 | 20 | 30 |
| Max Discharge Pressure [kPag] | 1700 | 2000 | 2200 | 2300 | 2400 | 2400 |

Figure 2:
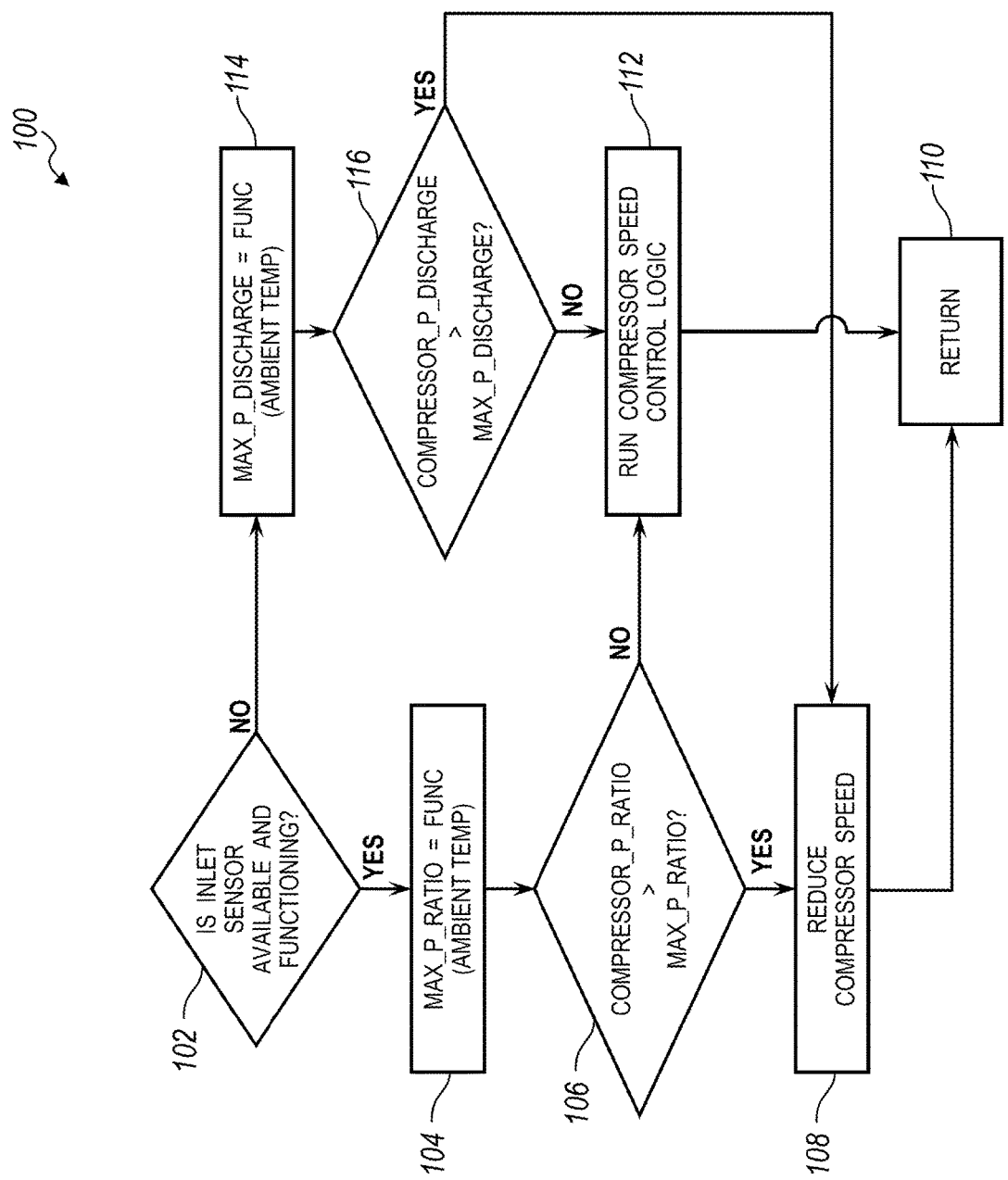
FIG. 2 is a flowchart illustrating an exemplary algorithm implemented by a controller to control the compressor of the HVAC system, according to one embodiment.

A flow chart is provided in FIG. 2 to illustrate an exemplary algorithm 100 executed by at least one of the controllers in the vehicle for controlling the compressor.

At 102, an initial inquiry is made as to whether a suction or inlet pressure sensor is available and functioning in the HVAC system. One example of such an inlet pressure sensor is low pressure sensor 68 of FIG. 1. This inquiry can be avoided in the case where the vehicle does not include an inlet pressure system, and the algorithm can proceed to 114. If the inlet pressure sensor is available and functioning, the algorithm proceeds to 104. At 104, a maximum allowable pressure ratio (Max_P_ratio) is computed. As described above, this ratio represents the ratio of discharge pressure to the suction pressure of the refrigerant through the compressor. The maximum allowable pressure ratio is a function of the ambient air temperature, as shown and described with respect to Table 1 above.

At 106, the controller compares the current operating compressor pressure ratio (Compressor_P_ratio) to the maximum pressure ratio. If the current compressor pressure ratio exceeds the maximum allowable pressure ratio, the controller commands the compressor (or its associated motor) to reduce in operating speed at 108. The algorithm returns at 110, allowing the pressure ratio to be analyzed again. The controller can continue to reduce the compressor operating speed until the current compressor pressure ratio no longer exceeds the maximum allowable pressure ratio. When this happens, the controller runs the standard compressor speed control logic at 112 and resumes normal variable-speed operation.

If, at 102, the controller determines that the inlet pressure sensor is no longer functioning properly, or if the vehicle is not provided with an inlet pressure sensor, then the algorithm proceeds to 114. At 114, a maximum allowable discharge pressure (Max_P_discharge) is utilized in place of the discharge-to-suction pressure ratio. This maximum discharge pressure is also a function of ambient air temperature, as shown and described with reference to Table 2 above.

The controller uses this variable maximum discharge pressure at 116. At 116, the controller compares the current compressor discharge pressure to the maximum allowable discharge pressure. If the current compressor discharge pressure exceeds the maximum allowable discharge pressure, the operational speed of the compressor (or its associated motor) is reduced at 108. The reduction in speed can continue as the algorithm returns and repeats until the current discharge pressure no longer exceeds the maximum allowable discharge pressure. If the maximum discharge pressure is not exceeded at 116, then the standard compressor speed control logic is implemented at 112.

It should be understood that the references to pressure ratios above are exemplified in terms of absolute pressure. However, these can be readily converted to gauge pressure, depending upon the system requirements, as one of skill in the art recognizes.

It should also be understood that the tables above are calibratable. The actual ratio numbers or thresholds can be calibrated to fit the needs of each specific vehicle. For example, based on the specific abilities of the compressor selected for use in the vehicle, the actual ratios and thresholds can also vary accordingly. The tables are merely exemplary.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of controlling a compressor in an HVAC system of a vehicle, the method comprising:
   receiving signals from the inlet and outlet pressures sensors;
   varying an operating speed of the compressor in response to a ratio of outlet pressure to inlet pressure of the compressor exceeding a variable pressure-ratio-threshold, wherein the ratio is based on the signals from the inlet and outlet pressure sensors; and
   in response to a signal loss from an inlet pressure sensor, limiting the operating speed of the compressor based on an outlet pressure of the compressor exceeding an outlet pressure threshold, wherein the outlet pressure is based on the signal from the outlet pressure sensor alone after signal loss from the inlet pressure sensor, and after varying the operating speed of the compressor, and
   varying the pressure-ratio-threshold based on ambient air temperature.

2. The method of claim 1, further comprising reducing the pressure-ratio-threshold as ambient air temperature increases.

3. The method of claim 1, wherein the varying of the operating speed includes reducing the operating speed.

* * * * *